United States Patent [19]

Flemming

[11] 3,943,998

[45] Mar. 16, 1976

[54] LAWN EDGE TRIMMING IMPLEMENT

[76] Inventor: John Paul Flemming, 7 Serpentine Parade, Vaucluse, Sydney, New South Wales, Australia, 2030

[22] Filed: Feb. 10, 1975

[21] Appl. No.: 548,890

[30] Foreign Application Priority Data

Feb. 11, 1974 Australia.............................. 6532/74

[52] U.S. Cl. .................... 172/17; 56/239; 172/136; 172/355
[51] Int. Cl.²............................................. A01G 3/06
[58] Field of Search ............. 172/13, 14, 15, 16, 17, 172/18, 136, 355, 375; 56/229, 239, 245; 30/292, 307, 329, 339, 342, DIG. 5

[56] References Cited
UNITED STATES PATENTS

| | | | |
|---|---|---|---|
| 1,338,123 | 4/1920 | Coniglio............................... | 172/17 |
| 1,693,808 | 12/1928 | Catudal................................ | 172/17 |
| 1,761,858 | 6/1930 | Werk .................................... | 172/16 |
| 1,796,606 | 3/1931 | McBride et al....................... | 30/292 |
| 1,798,251 | 3/1931 | Galvin................................... | 30/292 |
| 1,916,749 | 7/1933 | Biringer ............................... | 172/13 |
| 2,075,301 | 3/1937 | Pipenhagen.......................... | 30/292 |
| 2,302,145 | 11/1942 | Popper.................................. | 30/339 |
| 2,743,658 | 5/1956 | Wynstra............................... | 172/13 |
| 2,896,389 | 7/1959 | Dupres.................................. | 56/239 |
| 3,144,084 | 8/1964 | Smith.................................... | 172/15 |

*Primary Examiner*—Richard C. Pinkham
*Assistant Examiner*—Richard T. Stouffer
*Attorney, Agent, or Firm*—Merriam, Marshall, Shapiro & Klose

[57] ABSTRACT

A manually operable lawn-edge trimming implement consists of a blade-carrier, a knifing blade and a broom-stick handle by which the implement may be presented to the lawn edge and traversed therealong with the blade obliquely penetrated into the earth along the line of edge trimming. The blade-carrier acts as a clamp for removably holding the replaceable knifing blade, and the blade-carrier is supported by an axle on two wheels which are well spaced apart so as to prevent grass crushing in the lawn-edge vicinity.

11 Claims, 4 Drawing Figures

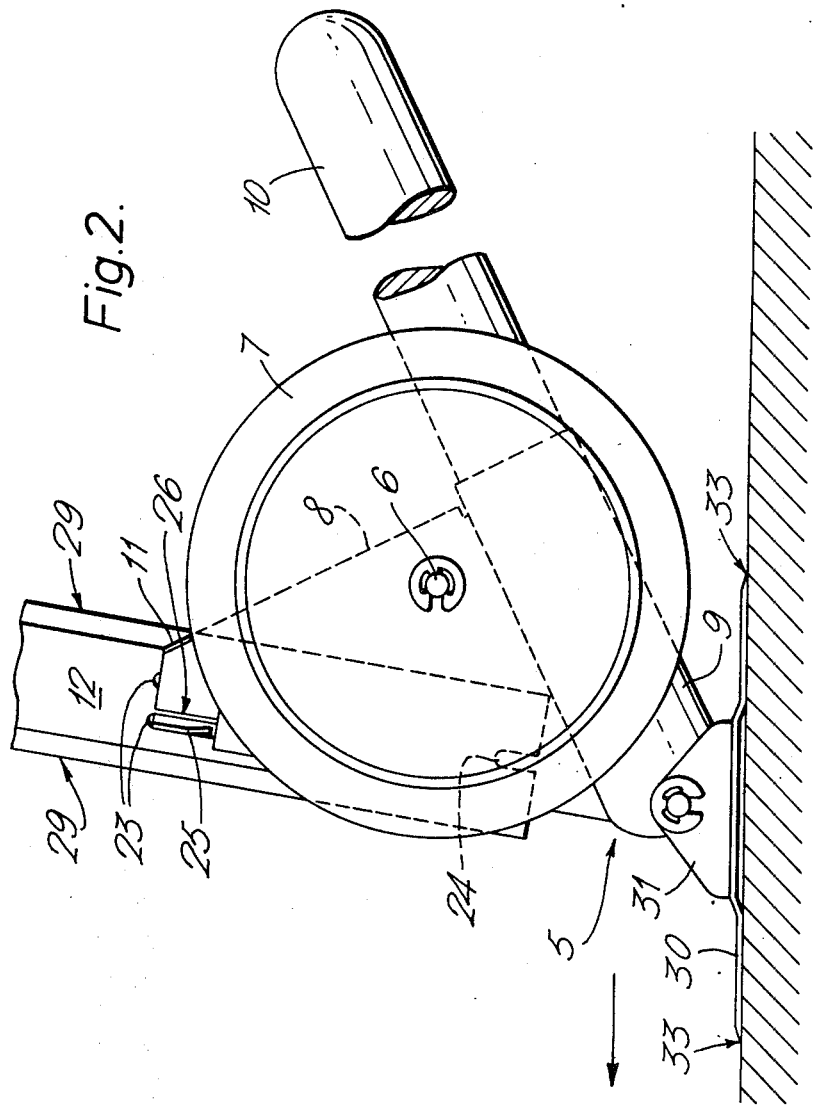

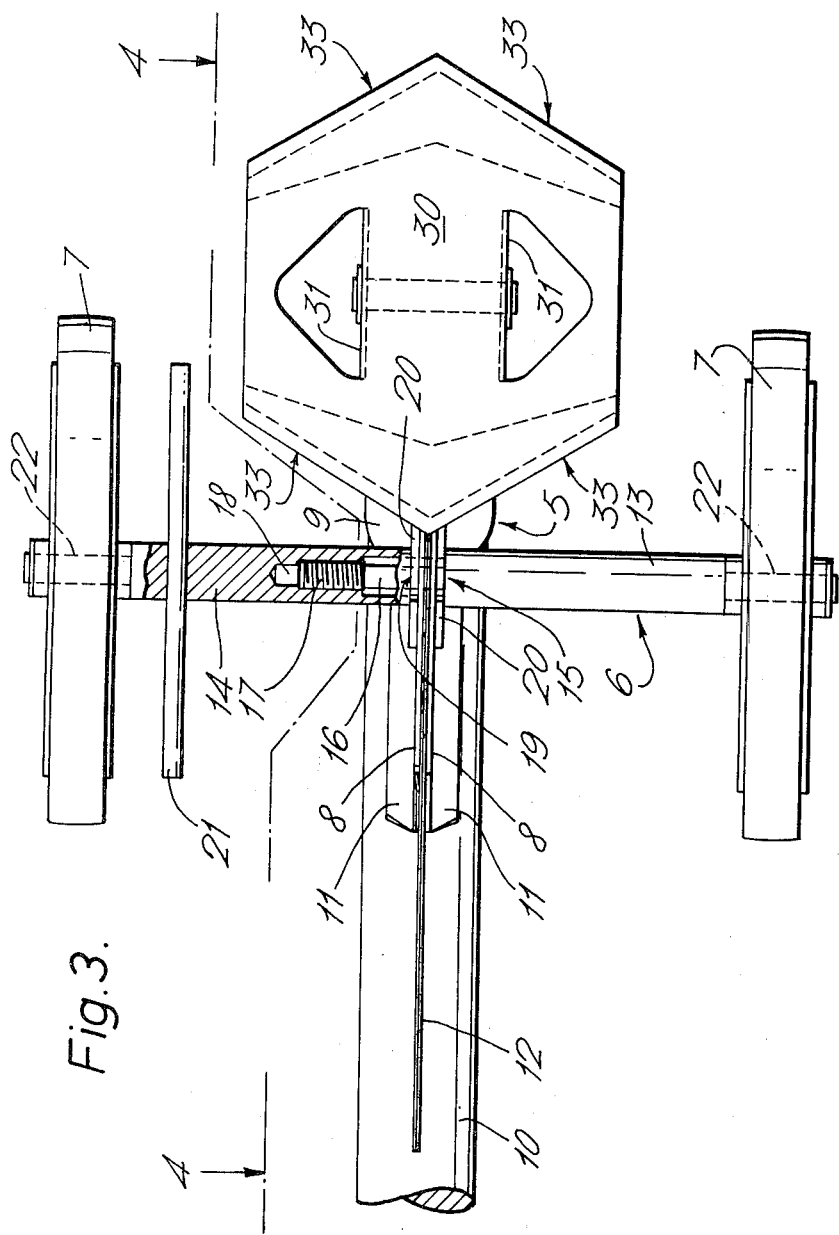

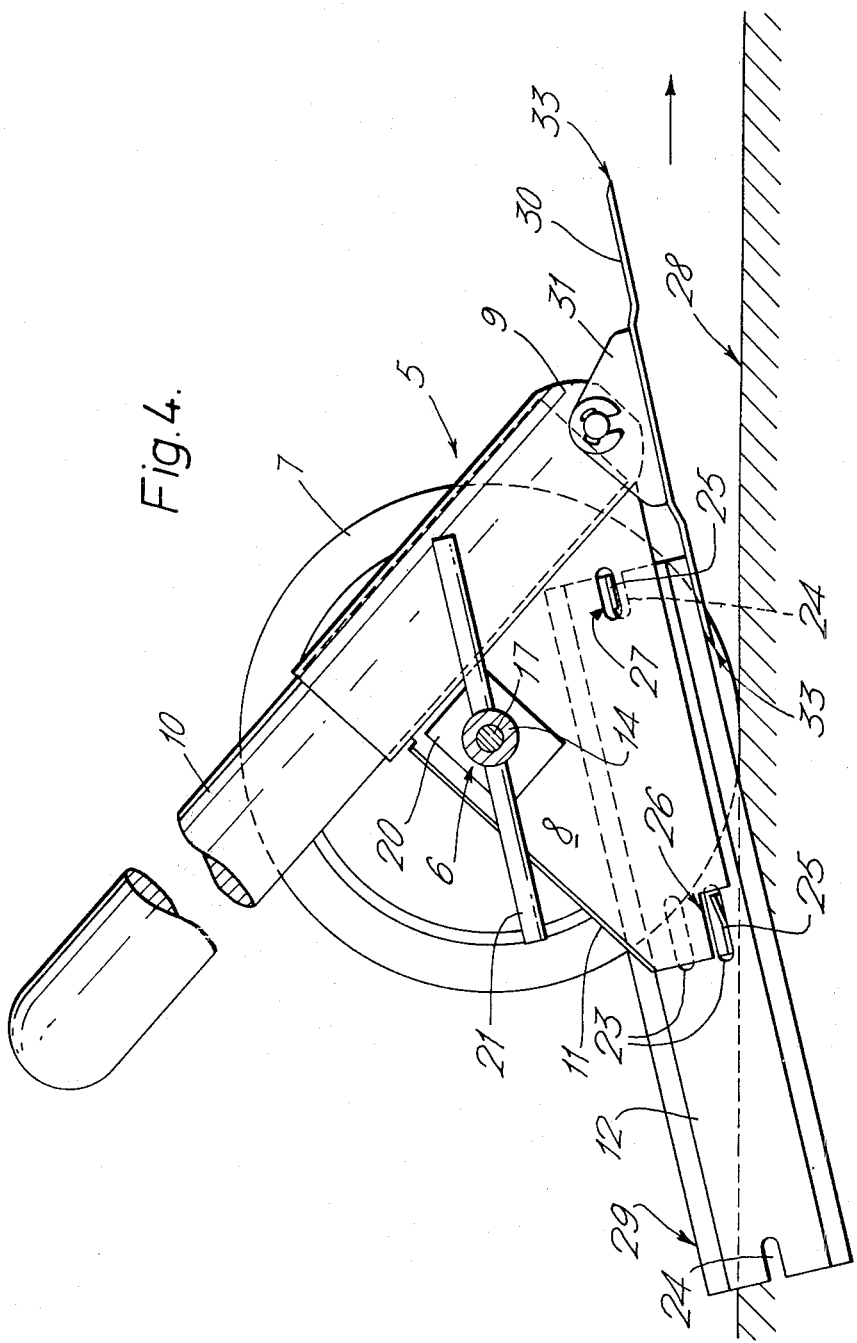

LAWN EDGE TRIMMING IMPLEMENT

The object of this invention is to provide a manually operable lawn edge trimming implement which is inexpensive, easily used and markedly effective by comparison with implements heretofore devised and intended to serve the same purposes.

The invention is referable to lawn edge trimmers of the kind comprising grass cutting means, a handle on which the cutting means are mounted and by manual use of which the cutting means may be effectively presented to the work, and what may be called runner means whereby the implement, when travelled along a lawn edge, may be kept under control and appropriately directed and applied to the work.

The prior art implements of the general type just above described are three kinds:

a. In the first kind of prior implement the cutting means consist of a circumferentially sharpened disc rotatably mounted on a handle, and the runner means take the form of a narrow drum which is smaller in diameter than the cutter disc and is concentrically fixed on one side of that disc so that it may be rolled along an edge margin of a paving in direct contiguity with the line of lawn edge along which trimming is required. This first kind of implement is objectionable in several respects. The drum acts as a drive for the cutter disc and thus the disc, when penetrated into the earth (as it is during use) rotates relative to the earth with which it is in frictional contact; this, combined with the fact that the amount of the disc in contact with the earth is much greater than the amount merely necessary for grass cutting purposes, makes use of the implement extremely laborious. A still greater disability, in this kind of implement, is that the driver drum depresses and crushes grass lying in its path and even if this crushed grass is severed by the cutter disc it is difficult to remove from the paving and causes that paving to be objectionably stained.

b. The second kind of prior implement is the same as the first except that instead of having a cutter disc it has a radially bladed star wheel or spider which rotates in smear with a stationary shear blade fixedly mounted on or relative to the implement handle so that grass cutting will be effected by a scissoring action of the blade 5. This second form of implement is objectionable for the same reasons as the first, and in both of these forms a further disability is that in use the cutting elements become blunted very quickly but cannot be readily replaced, neither can they be readily re-sharpened.

c. The third kind of prior implement, with which the present application is more directly classifiable, consists of a handle, runner means in the form of a curved foot fixed on one end of the handle, and cutting means constituted by a flat blade detachably secured to the leading end of the foot so that the blade trails obliquely and downwardly away from the leading end of the foot. This third form of implement is used by penetrating the blade obliquely into the earth along the line of required trimming and then moving the blade along that line translationally (that is, without endwise or "sawing" movement of the blade) so to knife away the grass to be severed as distinct from shearing it by scissor action or severing it by use of a rotatable edge-sharpened disc, as discussed above. This third kind of prior art implement overcomes some of the disabilities displayed by the first and second kinds mainly because of its use of a knifing blade which is readily detachable for re-sharpening or renewal. However, this third form somewhat exacerbates the grass crushing difficulty referred to above in that the foot of the implement rides the paving directly contiguous to the lawn edge with heavily loaded frictional contact, so that the severed (or unsevered) grass is not merely crushed by the implement foot, it is forcibly ground into the paving margin by that foot. This third form of implement is also objectionable by reason of the fact that most lawn edge pavings (usually concrete) are highly abrasive so to cause the implement foot which frictionally rides the paving, under heavy hand pressure from the user, to wear away very rapidly. Another point in this connecton is that heavily loaded frictional contact between the implement foot and the paving increases the work load for the user substantially beyond what is necessary merely for grass trimming purposes.

The present invention, in essence, resides in a blade-carrier for a lawn edge trimming implement of the kind including a handle which enables the implement to be manually traversed along a lawn edge with a blade in knifing relationship to said lawn edge, said blade-carrier comprising:

a. a blade holder incorporating means for detachable connection of a knifing blade thereto, b. an axle upon which said holder is mounted, and c. two freely rotatable wheels on said axle, both being spaced from said holder and respectively located on either side thereof.

It will be appreciated that the implement handle may simply be a wooden or other rod such as an ordinary broomstick; indeed, in the plans for commercialisation of the present invention consideration is being given to the marketing of the implements without handles and simply instructing the purchaser, at the time of purchase, to buy a broomstick or like rod and himself attach it or fit it up to the blade carrier.

It will be further appreciated that the detachable blade to be used as part of the implement may be of known kind, for example that already known for use in prior art implements of the third kind discussed above. To accommodate such a blade it would only be necessary to provide a blade-carrier according hereto with bolt-holes and a bolt for detachable connection of the blade to the carrier.

Although known blades may be used as just discussed, it is preferable for the blade to be one specially devised for use in the present implement, and such a preferred blade is described later herein.

It will be clear that blades required to operate in gritty earth bordered by concrete paving (for example) must be expected to have a working life considerably shorter than that of the remainder of the implement, Thus, as part of the marketing arrangements in contemplation as referred to above, consideration is being given to the separate sales of blades packeted in plurality (five per packet, for example) so that these may be used on a throw-away basis in much the same way as has long been common in the marketing of safety razor blades.

The preferred embodiments of the invention incorporate simple means by which grass to be severed may be lightly depressed towards a paving margin (as distinct from being pressed hard against such a margin) just ahead of the oncoming implement blade. This is desirable because upstanding grass blades are then brought close to the margin and at the same time caused to lie athwart the blade path so to be in better disposition for severance by the oncoming knifing blade.

A preferred embodiment of the invention is illustrated in the drawings herewith.

FIG. 1 is a side elevation of a lawn edge trimming implement incorporates a grass depressor plate in the form of a scraper-blade.

FIG. 2 repeats FIG. 1 but with the whole implement having been turned through 180° so that its scraper blade is placed flatly against a paving for a purpose described later herein.

FIG. 3 is a partly-sectioned inverted plan taken in the direction indicated by line 3—3 in FIG. 1.

FIG. 4 is a sectional side elevation taken on line 4—4 in FIG. 3.

Figure 1:
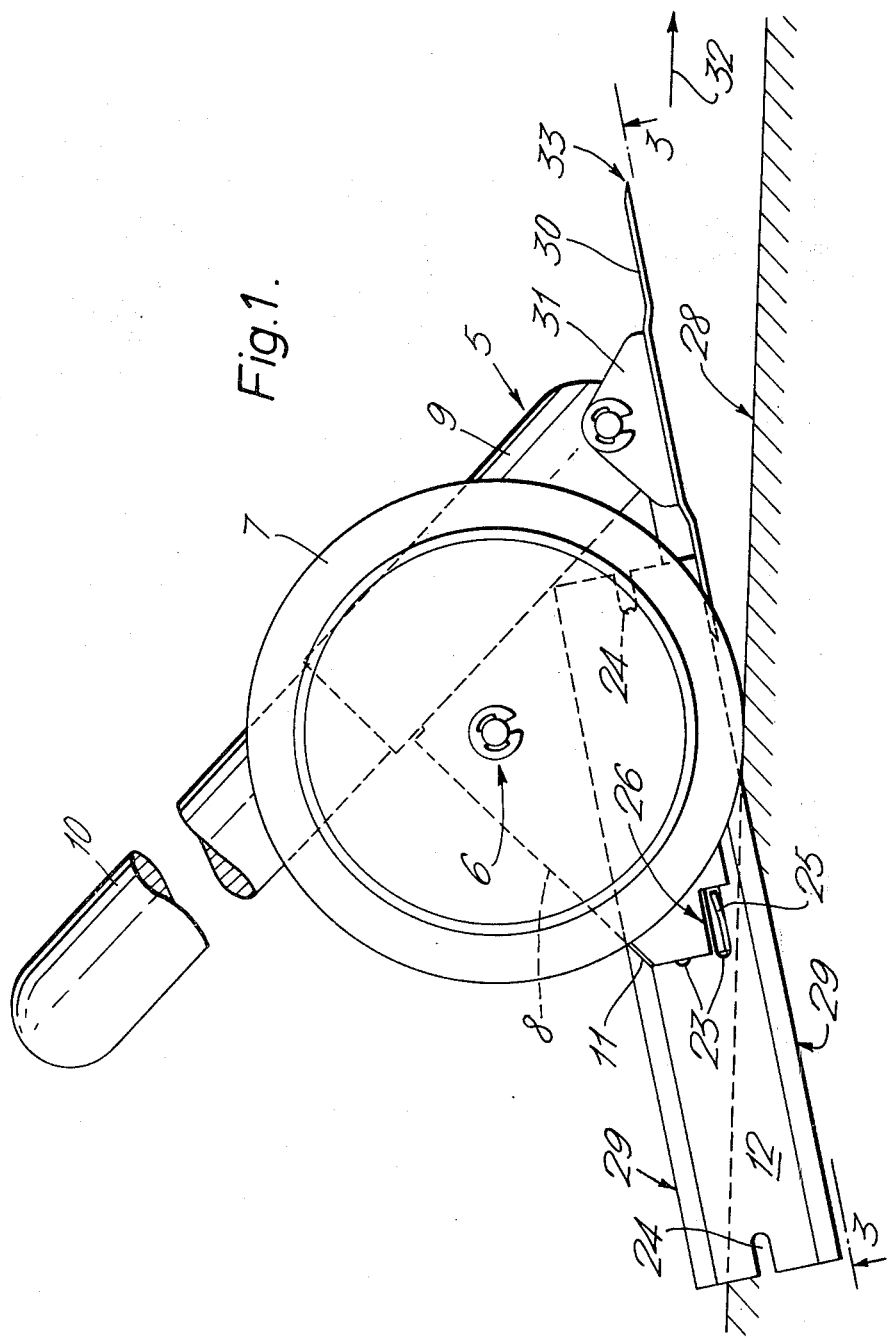

Referring to the drawings, the blade-carrier consists of blade-holder 5, axle 6 upon which the holder is mounted, and two freely rotatable wheels 7 on the axle, both spaced from the holder and respectively located on either side thereof.

The blade-holder 5 consists of a pair of roughly triangular cheek-plates 8 which along one side are adjoined by a handle socket sleeve 9 able to hold a broomstick type of handle as indicated at 10. The cheek-plates are preferably stiffened by edge flanges 11. The cheek-plates are adapted to be clamped together so to keep hold of a blade (12) inserted between them. The cheek-plate clamping means are preferably such (as shown) as will not only clamp the cheek-plates each toward the other, but also reduce the inside diameter of the socket sleeve so that it may take a firm hold upon a handle otherwise freely insertable therein. In further preference, these "compound" clamping means are also constituted by the axle 6.

To this end axle 6 is made in two parts; a male part 13 and a female part 14. Part 13 has a clamping shoulder 15 from which a stem 16 projects. This stem is preferably hexagonal or otherwise shaped so that it may extend non-rotably through complementarily shaped holes (not shown) in the cheek-plates 8. Stem 16 has a threaded extension 17 able to screw into the threaded inner end 18 of a counterbored hole which opens to a clamping end face 19 of the female part 14.

It will be seen that the two cheek-plates 8 can be clamped together (between clamping shoulder 15 and end face 19 which bear against load-spreading washers 20) by rotation of axle portion 14 with the aid of crossbar 21. The free ends of the axle portions 13 and 14 are formed as journals 22 upon which the wheels 7 are freely revolubly mounted.

The preferred way of holding a blade relative to and between the cheek-plates 8 is to provide the blade 12 with apertures being at least one hole 23 and end slots 24. Lugs 25 on one of the cheek-plates are able (when the cheek-plates are clamped together) to extend through hole 23 and one of the slots 24, and into clearance openings being clearance gap 26 and hole 27 formed in the other of the two cheek-plates, thus to hold the knifing blade 12 in the oblique working disposition, relative to a lawn or paving surface indicated at 28.

The blade 12 is of elongated rectangular form and, preferably, both of its longitudinal edges 29 are sharpened so to permit the blade to be turned upside-down when its previously lower-most edge becomes blunted, thus, to emplace the other sharpened edge in working position. The knifing blade may also be turned end-for-end relative to its mounting between the cheek plates; thus, in effect, providing four different positions in each of which a sharpened and previously unused cutting edge may be emplaced in work position. The blade preferably has two holes 23 (as shown) so as to provide a degree of blade obliquity adjustment to suit the user.

As previously indicated herein, the illustrated preferred embodiment of the invention includes means whereby grass to be severed may be lightly depressed to lie athwart the path of the knifing blade 12 as it advanced along a lawn edge. These means consist of a grass depressor plate 30 having offset lugs 31 by which it is pivotally mounted on the leading end of the socket sleeve 9.

When during ordinary use in the trimming of a lawn edge, the implement is positioned in relation to a lawn edge and advanced therealong in the direction indicated by arrow 32 in FIG. 1, plate 30 acts as a deflector to depress the grass (without crushing it) so that it lies across the path of the oncoming knifing blade. This plate 30 is preferably provided with sharpened edges 33 so that it may be effectively used as a scraper blade to clear severed grass from the lawn edge vicinity or cut away grass which has escaped severance by the knifing blade 12. To use plate 30 in this manner, the whole implement is turned through 180° as shown in FIG. 2. By doing this scraper blade 30 is brought flatly into contact with the paving and then moved along the lawn edge for performance of the clearing and severing action referred to above.

When a lawn is to be moved and edge-trimmed, it is better to trim and scrape the contiguous paving margin before mowing, so that during the mowing procedure the cut and freed lawn edge trimmings will be picked up by the mower for deposit in its grass catcher.

The claims defining the invention are as follows:

1. A blade-carrier for a lawn edge trimming implement including a handle which enables the implement to be manually traversed along a lawn edge with a blade in knifing relationship to said lawn edge, said blade-carrier comprising:
   a. a blade holder consisting of a pair of spaced generally parallel cheek-plates joined together by a handle-receiving socket sleeve extending therebetween, said sleeve being provided with a shape having a given diameter, said sleeve, in joining said check-plates together, being joined to each of said check plates in such a manner that as said check-plates are drawn closer together, the diameter of said sleeve is diminished.
   b. releasable clamping means to clamp said cheek-plates together and thereby to hold a removable knifing blade when positioned between said cheek-plates and to diminish the diameter of said socket sleeve,
   c. blade retention means to hold said knifing blade between said cheek-plates when said knife blade is positioned therebetween upon tightening of said clamping means,
   d. an axle upon which said blade holder is mounted, and
   e. two freely rotatable wheels on said axle, both being spaced from said blade holder and respectively located on either side thereof.

2. A blade-carrier accordingly to claim 1 wherein said axle is in two parts one of which extends through said cheek-plates and is screw threaded into the other of said parts whereby said parts constitute said clamping means.

3. A blade-carrier according to claim 1 wherein said blade retention means comprise lugs on one of said cheek-plates which extend freely through clearance spaces in its companion cheek-plate and through apertures in a knifing blade when inserted between said cheek-plates.

4. The combination with a blade-carrier according to claim 1 of a grass depressor plate mounted on said blade holder, and disposed ahead of said blade when said blade is in use.

5. The combination according to claim 4 wherein said grass depressor plate has sharpened edges so that it is useable as a scraper blade.

6. A lawn edge trimming implement comprising:
a. a blade-holder consisting of a pair of spaced generally parallel cheek-plates joined together by a handle-receiving socket sleeve extending therebetween, said sleeve being provided with a shape having a given diameter, said sleeve, in joining said check-plates together, being joined to each of said check-plates in such a manner that as said check-plates are drawn closer together, the diameter of said sleeve is diminished.
b. releasable clamping means to clamp said cheek-plates together and thereby to hold a removable knifing blade positioned between said cheek-plates and to diminish the diameter of said socket sleeve,
c. blade retention means on said cheek-plates,
d. an axle upon which said blade holder is mounted,
e. two freely rotatable wheels on said axle, both being spaced from said blade holder and respectively located on either side thereof,
f. a handle having one end entered within said socket sleeve, and
g. a knifing blade detachably clamped between said cheek-plates and so arranged that when said handle is grasped by a user so to project forwardly and downwardly from the user towards a lawn edge, said wheels straddle said lawn edge when said blade is disposed in knifing relationship with said lawn edge.

7. An implement according to claim 6 wherein said axle is in two parts, one of which extends through said cheek-plates and is screw threaded into the other of said parts whereby said parts constitute said clamping means.

8. An implement according to claim 7 wherein said blade retention means comprise lugs on one of said cheek-plates which extend freely through clearance spaces in its companion cheek-plate and through apertures in a knifing blade when inserted between said cheek-plates.

9. The combination with an implement according to claim 6 of a grass depressor plate mounted on said blade holder and disposed ahead of said blade when said implement is in use.

10. The combination according to claim 9 wherein said grass depressor plate has sharpened edges so that it is useable as a scraper blade.

11. An implement according to claim 8 in which said knifing blade is of elongated rectangular form having at least one of its longitudinal edges sharpened, and being apertured by at least one lug-receiving hole formed in its middle region and a lug-receiving slot at each of its ends.

* * * * *

UNITED STATES PATENT AND TRADEMARK OFFICE
CERTIFICATE OF CORRECTION

PATENT NO. : 3,943,998
DATED : March 16, 1976
INVENTOR(S) : John Paul Flemming

It is certified that error appears in the above-identified patent and that said Letters Patent are hereby corrected as shown below:

Col. 1, line 44, "smear" should be -- shear --.

Col. 2, line 38, delete "up".

Col. 2, line 54, delete "," and insert --.--

Col. 3, line 7, insert --which-- before "incorporates".

Col. 4, line 47, change "check-plates" to --cheek-plates--.

Col. 4, line 48, change "check-plates" to --cheek-plates--. (Two occurrences)

Col. 5, line 21, change "check-plates" to --cheek-plates--.

Col. 5, line 22, change "check-plates" to --cheek-plates--. (Two occurrences)

Signed and Sealed this eighth Day of June 1976

[SEAL]

Attest:

RUTH C. MASON
*Attesting Officer*

C. MARSHALL DANN
*Commissioner of Patents and Trademarks*